United States Patent

Townsend et al.

[11] Patent Number: 5,850,441
[45] Date of Patent: Dec. 15, 1998

[54] SYSTEM AND METHOD FOR KEY DISTRIBUTION USING QUANTUM CRYPTOGRAPHY

[75] Inventors: Paul David Townsend; Keith James Blow, both of Suffolk, United Kingdom

[73] Assignee: British Telecommunications public limited company, London, England

[21] Appl. No.: 612,880

[22] PCT Filed: Sep. 8, 1994

[86] PCT No.: PCT/GB94/01953

§ 371 Date: Mar. 8, 1996

§ 102(e) Date: Mar. 8, 1996

[87] PCT Pub. No.: WO95/07583

PCT Pub. Date: Mar. 16, 1995

[30] Foreign Application Priority Data

Sep. 9, 1993 [EP] European Pat. Off. .............. 93307120
Sep. 9, 1993 [EP] European Pat. Off. .............. 93307121
Oct. 5, 1993 [GB] United Kingdom .... PCT/GB93/02075
Dec. 23, 1993 [GB] United Kingdom .... PCT/GB93/02637

[51] Int. Cl.$^6$ .............................. H04L 9/00; H04B 10/00
[52] U.S. Cl. .............................. 380/21; 359/112; 380/44; 380/49
[58] Field of Search ................ 380/21, 44, 49; 359/112

[56] References Cited

U.S. PATENT DOCUMENTS

| | | |
|---|---|---|
| 4,965,856 | 10/1990 | Swanic . |
| 5,191,614 | 3/1993 | Lecong ....................... 380/49 |
| 5,243,649 | 9/1993 | Franson ....................... 380/9 |
| 5,307,410 | 4/1994 | Bennett ....................... 380/21 |
| 5,311,592 | 5/1994 | Udd ............................ 380/9 |
| 5,418,905 | 5/1995 | Rarity et al. .............. 359/158 |
| 5,515,438 | 5/1996 | Bennett et al. ............. 380/21 |
| 5,675,648 | 10/1997 | Townsend . |

OTHER PUBLICATIONS

A. Muller et al, Europhysics Letters, 23(6), PP. 383–388, 20 Aug. 1993.

P.D. Townsend et al, Electronics Letters, 29, No. 7, Stevenage, Herts, GB., 1 Apr. 1993.

*Primary Examiner*—Stephen C. Buczinski
*Attorney, Agent, or Firm*—Nixon & Vanderhye P.C.

[57] ABSTRACT

A method of communication based on quantum cryptography is modified to include an initial step of outputting from, e.g., a transmitter, a single-photon signal, which may be unmodulated. A receiver then randomly selects one of a plurality of encryption alphabets corresponding to different, non-commuting quantum mechanical operators. The receiver modulates the single-photon signal with the selected operator and returns the signal to the transmitter. The transmitter in turn randomly selects a quantum mechanical operator and uses that operator in detecting the returned signal modulated by the receiver. Alternatively, the transmitter may randomly select one of a plurality of encryption alphabets and use that encryption alphabet in modulating the signal. The signal is then further modulated at the receiver using a predetermined encryption alphabet. When the signal is received back at the transmitter, it is detected using the same quantum mechanical operator as was initially used to modulate it. Comparison is made of the states of the single-photon signals as transmitted and received to detect the presence of any eavesdropper.

19 Claims, 7 Drawing Sheets

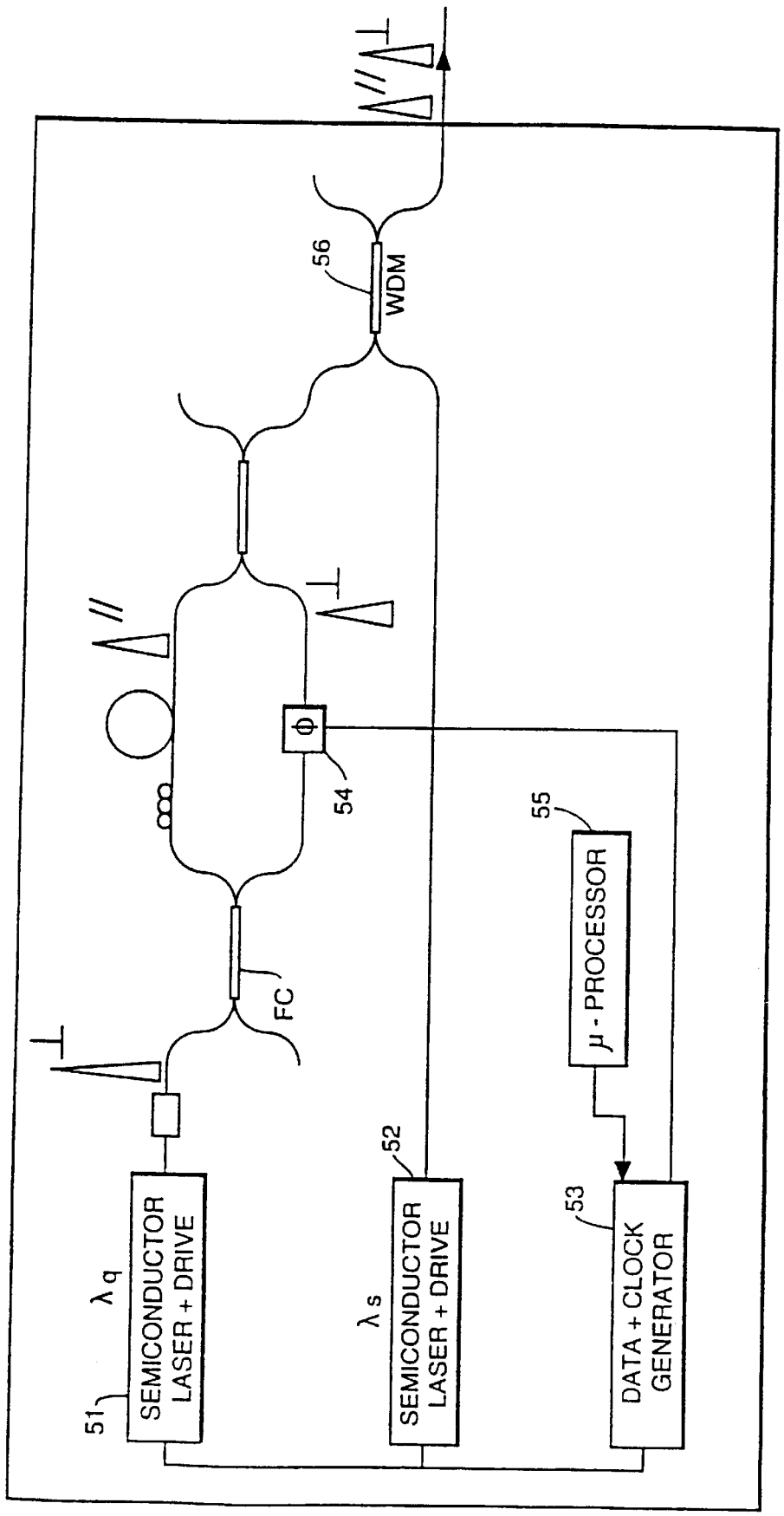

SYSTEM AND METHOD FOR KEY DISTRIBUTION USING QUANTUM CRYPTOGRAPHY

BACKGROUND TO THE INVENTION

1. Field of the Invention

The present invention relates to a system for the communication of encrypted data using quantum cryptography.

2. Related Art

In quantum cryptography, data is encoded at the transmitter and decoded at the receiver using some specified algorithm which is assumed to be freely available to all users of the system. The security of the system depends upon the key to the algorithm being available only to authorised users. To this end, the key is distributed over a secure quantum channel, that is a channel carried by single-photon signals and exhibiting non-classical behaviour, as further discussed below. On the quantum channel, the presence of any eavesdropper can be detected as a change in the statistics of the received data.

Hitherto, methods of communicating using quantum cryptography have comprised the steps of:

(a) randomly selecting one of a plurality of coding alphabets corresponding to different, non-commuting quantum mechanical operators and encoding a signal for transmission on the quantum channel using the selected operator;

(b) randomly selecting one of the different quantum mechanical operators and using that operator in detecting the signal transmitted in step (a);

(c) repeating steps (a) and (b) for each of a multiplicity of subsequent signals;

(d) communicating between the transmitter and the receiver independently of the encryption alphabets to determine for which of the transmitted signals common operators were selected for transmitting and detecting, (e) comparing the signals transmitted and detected in steps (a) and (b) to detect any discrepancy resulting from the presence of an eavesdropper; and, (f) in the event that in step (e) no eavesdropper is detected, using at least some of the data transmitted in steps (a) and (b) as a key for encryption/decryption of subsequent data transmissions between the two users of the channel. This scheme is described in detail in C. H. Bennett, G. Brassard, S. Breidbart and S. Wiesner, in "Advances in cryptology: Proceedings of Crypto'82, (Plenum, N.Y., 1983); C. H. Bennett and G. Brassard, IBM Technical Disclosure Bulletin, 28 3153, (1985). Conventionally, the method has been carried out between a single transmitter and receiver only. Our co-pending international application entitled "Quantum Cryptography on a Multiple Access Network" and filed this day, (PCT/GB94/01952), the subject matter of which is incorporated herein by reference, describes the extension of such techniques to multiple-access systems including a plurality of receivers.

SUMMARY OF THE INVENTION

According to a first aspect of the present invention, a method of communicating a key between a transmitter and a receiver using quantum cryptography is characterised in that the method includes the initial steps of:

(a) outputting a single-photon signal;

(b) modulating the single-photon signal at the receiver and returning the modulated signal to the transmitter; and (c) detecting at the transmitter the returned signal modulated by the receiver in step (b).

Preferably in step (a) the single-photon signal is output from the transmitter, but alternatively a separate source may be used to output the signal.

The method adopted in the present invention makes possible a dramatic reduction in the cost and complexity of the communication system. Even in a system with a single transmitter and receiver there are significant savings, but the savings are particularly marked in a multiple-access system. Hitherto, using the conventional quantum cryptography method outlined above, it has been necessary for each receiver to include both a modulator for selecting the measurement basis and also a single-photon detector to register the outcome of the measurement. The present invention however makes it unnecessary for the receiver to include a single-photon detector and the generation of the single-photon signal and the detection of the single-photon signal may both be carried out in the transmitter. The receiver, rather than detecting the incoming signal destructively as before, is required only to modulate the signal and to return it to the transmitter. This can be achieved using in-line modulators, e.g. phase or polarisation modulators, in a ring architecture, or alternatively using star, tree or bus architectures incorporating reflective modulators at each receiver.

A further advantage of the present invention is that it makes possible the use of a channel calibration function as described in the applicant's co-pending international Application No. PCT/GB93/02637 (WO94/15422 corresponding U.S. Ser. Nos. 08/617,848; 08/612,881; and 08/464,710 now U.S. Pat. No. 5,675,648) the subject matter of which is incorporated herein by reference, with that function confined to the transmitter, rather than having to be carried out across the network from the transmitter to each receiver.

The single-photon signals as initially output on the quantum channel may be unmodulated, in which case the receiver may select (randomly or on a basis producing random-like statistics) one of a plurality of encryption alphabets corresponding to different non-commuting quantum mechanical operators.

As discussed in our above cited co-pending applications, single-photon pulses may be obtained from a parametric amplifier source or, alternatively, weak pulses of light from an attenuated laser which in general contain no more than one and on average substantially less than one photon per pulse may be used. Both types of pulse exhibit the required quantum mechanical properties and the term "single-photon pulse" is used herein to denote all such pulses irrespective of how they are produced. The pulses are encoded in different phase or polarisation states.

While the protocol adopted in this aspect of the invention can be implemented with the transmitter outputting unmodulated single photons, a further increase in security can be obtained if the transmitter modulates the photons before they are output to the receiver. The transmitter may be, for example a network server or "controller" incorporating both a transmit section and a detector section. As before, the receiver then modulates the received photon non-destructively and returns them to the transmitter. The modulation at the receiver takes the form of an additional modulation, e.g. a phase shift, in addition to that imposed initially at the controller. The controller's transmit section may, for example, use two encoding bases with four possible phase states in total BASIS 1: 0° = 0, 180° = 1      BASIS 2: 90° = 0, 270° = 1
-and its detector section may use two measurement bases
BASIS 1: 0°                    BASIS 2: 90°

In operation the controller's transmitter section randomly encodes each photon with one of the four phase states, and randomly choses one of the two bases for the measurement of the photon in its receiver section after propagation around the network. During key distribution a given user Ri randomly modulates each photon with phase shifts e.g. phi=0° or 90°, that is using two phase shifts corresponding to symbols from different encryption alphabets (where "encryption" here as above refers to the coding used in the key distribution procedure). After the transmission the controller analyses the received data for deterministic events, of the type listed below, which reveal Ri's modulator setting unambiguously:
(here D (disagree) implies sent bit not equal to received bit, and A (agree) implies sent bit equals received bit)
Controller used basis 1 for send and receive: D implies user phase shift=90°
Controller used basis 1 for send and basis 2 for receive: D implies user phase shift =0°
Controller used basis 2 for send and receive: D implies user phase shift=90°
Controller used basis 2 for send and basis 1 for receive: A implies user phase shift =0°.

The controller keeps this data which corresponds on average to 1 in 4 of the received bits and discards the rest, and completes the protocol by publicly revealing to Ri the time slots in which these events occurred. The controller and Ri can now use the designation 0°=0, 90°=1, for example, to generate a shared key. If an eavesdropper has broken into the network at some point, or the system suffers from noise (which is always the case in practice), the key will contain errors. The controller and $R_i$ check this error rate during the public discussion and either discard the transmission if the level of eavesdropping is too high or use error-correction and privacy amplification to generate a shorter highly secret key. Note that in the current scheme key distribution is performed sequentially with each user on the network. However, if any other user $R_i$ were to perform synchronous modulations during key distribution to $R_j$, this would be detected via an increased error rate just as in the case of an eavesdropper. This scheme has the added advantage that the receiver only needs to provide two possible phase shifts, not four, thus simplifying the drive requirements for its modulator.

A second aspect of the present invention again uses a looped-back path from the receiver to the transmitter. In this aspect, however, the operation of the system resembles conventional quantum cryptography in that the transmitter initially modulates an outgoing single-photon signal using a randomly selected encryption alphabet and at least some of the signals modulated in this manner are detected destructively at one or more receivers.

According to the second aspect of the present invention, there is provided a method of communicating a key between a transmitter and a receiver using quantum cryptography characterised by a step of returning to the transmitter at least some of the encoded single-photon signals output by the transmitter, and subsequently comparing the states of the signals as transmitted and received at the transmitter, thereby detecting the presence of any eavesdropper intercepting the signal.

Others of the single-photon signals may be detected destructively at the receiver.

This aspect of the present invention may be used between a single transmitter/receiver pair, but again is particularly advantageous when used with a multiple-access network such as that disclosed and claimed in the present applicant's above-cited co-pending International application, (PCT/GB94/01952 corresponding to U.S. Ser. No. 08/605,048 ).

Using conventional quantum cryptography, while it is possible reliably to detect an eavesdropper who breaks into the quantum channel only, an eavesdropper can evade detection if he intercepts both the quantum channel and the public (classical) channel and imitates the legitimate receiver to the transmitter and the transmitter to the receiver. However when this aspect of the present invention is used, part of the public channel for the comparison of transmitted and received data is in effect made internal to the transmitter. This makes successful, undetected, intervention by an eavesdropper much more difficult. Additionally, as in the case of the standard point-to-point schemes, the looped network can be made completely secure against this attack on both channels by the use of secure authentication procedures as described in the Bennett/Brassard IBM Technical Disclosure Bulletin.

According to a third aspect of the present invention, there is provided a communications system for use in a method of quantum cryptography comprising a transmitter, one or more receivers, a network linking the transmitter to the or each receiver, and a source for generating a single-photon signal, characterised in that the or each receiver includes a modulator arranged to modulate a single-photon signal received from the source using a chosen modulation state, and is arranged to return the modulated single-photon signal to the transmitter, and in that the transmitter includes a single-photon detector arranged to detect the returned single-photon signal.

According to a fourth aspect of the present invention, there is provided a communications system for use in a method of quantum cryptography comprising a transmitter, one or more receivers, and a network linking the transmitter to the or each receiver, the transmitter including means for generating a single-photon signal and modulating the single-photon signal using a chosen encryption alphabet, the or each receiver including a single-photon detector for detecting a single-photon signal from the receiver, characterised in that the network includes a looped-back path for returning at least some of the single-photon signals output by the transmitter to the transmitter, and in that the transmitter includes a single-photon detector arranged to detect the returned single-photon signal, in use the transmitter comparing the states of the single-photon signals as transmitted and returned.

BRIEF DESCRIPTION OF THE DRAWINGS

Systems embodying the different aspects of the present invention will now be described in further detail, by way of example only, with reference to the accompanying drawings, in which:

FIGS. 5a and 5b are a transmitter output stage and a receiver respectively;

DETAILED DESCRIPTION OF EXEMPLARY EMBODIMENTS

Figure 1:
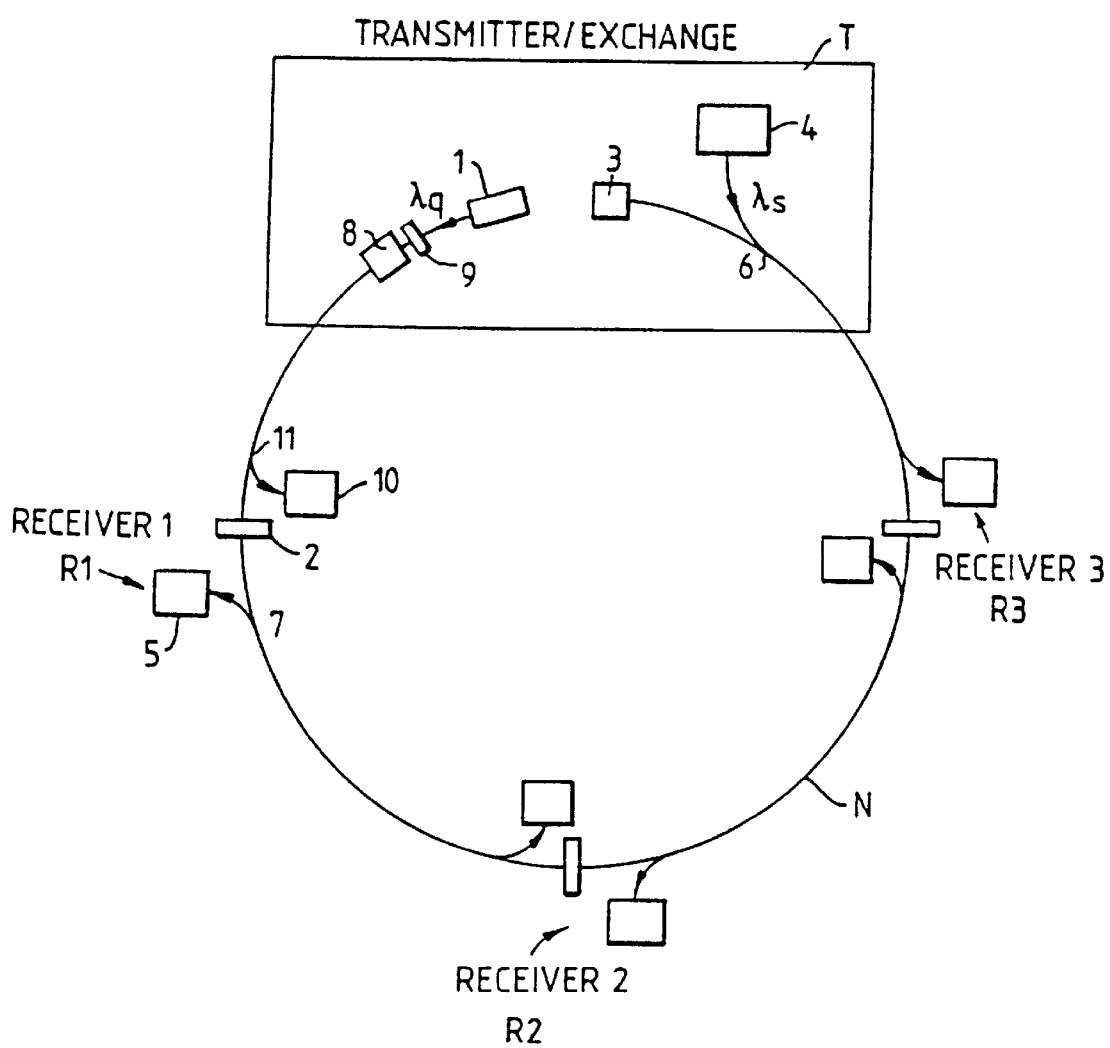
FIG. 1 is a block diagram of a ring network embodying the first aspect of the present invention.

As shown in FIG. 1, a communication system comprises a transmitter or "exchange/controller" T connected to three receivers R1–R3 via a passive optical network N having a ring topology. The transmitter T includes both a quantum channel source 1 for use in establishing a key by quantum cryptography, as further described below, and also a conventional intensity-modulated source for outputting a signal carrying conventional traffic. The quantum channel source 1 and standard source 4 operate at different wavelengths $\lambda_q$ and $\lambda_s$ respectively. The output from the quantum source 1 passes through a switchable attenuator 9 and a polariser and band-pass filter 8 tuned to the quantum channel wavelength $\lambda_q$.

Each receiver comprises a first standard detector 5 for the signal channel on $\lambda_s$, a detector 10 for multi-photon timing signals at the quantum channel wavelength $\lambda_q$, and a modulator 2, which in the present example is a polarisation modulator. The clock detector 10 is connected to the network N by a fibre coupler 11 which provides a weak tap at $\lambda_q$. The detector 5 for the signal wavelength is connected to the network by a WDM (wavelength division multiplexer) coupler 7. The WDM is a fibre coupler with a wavelength-dependent coupling characteristic. In the present case, the WDM ideally provides a straight-through route for the quantum channel, i.e. the coupling fraction out of the loop is small at $\lambda_q$, whilst at the signal wavelength $\lambda_s$ the coupling fraction has a much larger value $f_s$. Appropriate values are discussed below.

In use, the transmitter distributes keys sequentially to each of the receivers on the network using steps (a) to (g) of the modified protocol outlined above. At the start of this process, the system is initialised by outputting a multi-photon timing and calibration signal on the quantum channel wavelength $\lambda_q$. The timing and calibration processes are described in further detail in the abovecited co-pending international application. Each receiver monitors these timing/calibration pulses via a weak tap and a standard (i.e. multi-photon) detector 10 and thereby synchronizes its local clock with the transmitter. A detector system 3 in the transmitter includes a single photon detector which in the present example is an avalanche photodiode APD. Other detectors sensitive to single photons may be used, e.g. a photomultiplier tube. The APD is at this stage weakly biased in order to reduce its sensitivity and thereby avoid saturation effects from the multi-photon pulses. The output of this detector is monitored in order to linearise the polarisation state at the output of the ring using the polarisation controller 21, FIG. 2.

The quantum key distribution channel is arranged to operate independently of other transmission channels which use the network to carry either the encrypted data or standard (non-encrypted) signals. This is important since the quantum channel operates in a non-continuous burst transmission mode, whereas in general the data channels will be required to provide uninterrupted continuous transmission. The required separation of the quantum channel may be provided through use of a reserved wavelength, different from that used by the data channels. In this case the quantum channel could be isolated by means of wavelength-sensitive passive optical components such as WDM couplers (e.g. Scifam Fibre Optics P2SWM13/15B) and filters (e.g. JDS TB1300A). The quantum channel may lie within the 1300 nm telecommunication window along with several other channels reserved for conventional signal traffic. Alternatively the 850 nm window is reserved for the quantum channel. This has the advantage that singles-photon detectors for this wavelength (Silicon APDS) are relatively insensitive to 1300 nm light and therefore isolation from the data channels is easier to achieve. This approach would require WDM couplers such as the JDS WD813 to combine and separate the quantum and conventional channels. Alternatively the 1500 nm band might be used for conventional signal traffic while the 1300 nm band is reserved for the quantum channel. Since, the sensitivity of germanium APDs is high at 1300 nm and falls rapidly for wavelengths longer than about 1400 nm, these detectors would be an attractive choice for this particular wavelength division scheme. The wavelength separation technique would also allow active components such as optical amplifiers (e.g. erbium or praseodymium rare-earth-doped fibre amplifiers) to be used at the data channel wavelengths, whilst operating the quantum channel at a wavelength outside the spontaneous emission spectrum of the amplifier. If this were not the case, the spontaneously generated photons from the amplifier would easily saturate the detectors on the quantum channel.

Alternatively, it is possible to operate the quantum and data channels at the same wavelength, and achieve isolation by means of polarisation- or time-division multiplexing. The former case uses phase-encoding for the quantum channel, as described, e.g., in our co-pending International application PCT/GB 93/02637. The data channel operates on the orthogonal polarisation mode of the fibre, with isolation obtained by means of polarisation splitting couplers such as the JDS PB 100. In the time-division scheme, certain time slots are reserved for multi-photon data pulses which are detected by standard receivers linked to the network via standard fibre couplers. Saturation of the single-photon detectors during these time slots could be prevented either by means of switchable attenuators (intensity modulators) or by turning off the reverse bias to the devices. Any of these isolation techniques may also be employed to send the system timing information concurrently with the quantum key data. This approach may be useful if, for example, the timing jitter on the receiver local oscillators is too large to maintain system synchronisation over the timescale required for the quantum transmission. A further alternative technique provides the timing data concurrently with the quantum transmission using the same wavelength as the quantum channel. The receiver now contains, in addition, a standard detector such as a sensitive PIN-FET that is connected to the transmission fibre by a weak fibre tap that splits off e.g. −10% of the incoming pulse intensity. The intensity of every n-th pulse is made sufficiently large, say $10^5$ photons, that the standard detector registers a pulse which can be used for timing purposes. If n is sufficiently large, e.g. 1000, the APDs will not suffer from heating effects or saturation, and a ×1000 frequency multiplier can be used in the receiver to generate a local oscillator at the clock frequency.

Subsequently to the timing/calibration the attenuator 9 is switched on to attenuate the source so as to produce a single-photon output. Linearly polarised single photons are then transmitted onto the network. At a designated receiver, the single-photon signal is modulated using a randomly chosen polarisation base, e.g. the rectilinear (0°, 90°) or diagonal (−45°, +45°) polarisation states. The receiver records the state used in each time slot. The modulator used in the receiver may take the form of a solid-state or a liquid crystal-based Pockel's cell. The modulator may be a chiral Smectic-C LC cell, or a stack of such cells, as described in our above-cited co-pending international application (U.S. Ser. No. 08/605,048).

After passing through the modulator, the single-photon signal travels on and is again received back at the transmitter. There the transmitter makes a random choice of which measurement basis to use with the returned photon, and registers a 1 or a 0 depending upon the detected polarisation state.

Figure 2:
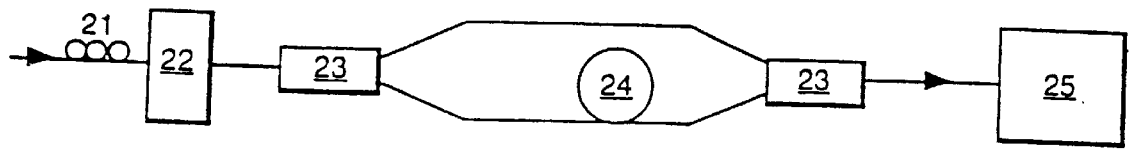
FIG. 2 is a block diagram of a single-photon detector for use with the network of FIG. 1.

In the present embodiment, the single photon detector system referenced 3 in FIG. 1 has the structure shown in FIG. 2. A polarisation splitter/combiner outputs a photon from one or other of its ports depending on the photon's polarisation state. Rather than using a separate APD for each output port, a single APD is used connected to the splitter/combiner by a network providing paths of different lengths for the outputs of the different ports. The APD may be a silicon or germanium APD such as the SPCM-100-PQ (GE Canada Electro Optics) or the NDL5102P (NEC). The APD has sufficient time resolution to distinguish the delay when a photon arrives via the longer path, and hence each photon is registered as a 0 or a 1 depending upon when it arrives during the clock period. The recombination of the two paths can be performed with very little loss using a second polarisation splitter coupler which now acts as a 2-into-1 polarisation combiner. An appropriate polarisation splitter coupler is the JDS PB100. When used as a combiner it gives a loss of around 0.6 dB. Alternatively a standard 50/50 polarisation independent coupler such as the Sifam P2S13AA50 could be used for recombination of the two paths, but this leads to a 3 dB loss penalty.

Polarisation couplers such as the JDS PB100 are 1-into-2 fibre couplers which separate the two orthogonal polarisation modes of the input fibre into two output fibres with the horizontal mode in one fibre and vertical in the other. This is functionally equivalent to a bulk-optics polariser such as a Wollaston prism. If the direction of input to a polarisation splitter is reversed, then a horizontally polarised state in one fibre can be coupled to a vertical state in the other fibre to form a low loss 2-into-1 coupler.

After the transmission of a number of such single-photon signals a "public" discussion phase is carried out, with the transmitter and receiver comparing the states of the signals modulated by the receiver and subsequently detected at the transmitter. This corresponds to steps (d) to (f) of the protocol outlined in the introduction above: It may take place on a separate optionally non-optical network, or as in this embodiment, on the same network as the other steps. It involves the receiver and the transmitter comparing publicly which bases they used in each clock period (but not the type of bit sent or received). They can then decide upon a list of clock periods in which (1) they both used the same basis and (2) a photon actually arrived back at the transmitter. In the case of an ideal error free channel, and if no eavesdropper is present, they expect their data for these clock periods to be in perfect agreement. Consequently, they can then publicly compare the actual results i.e. 0/1 sent, 0/1 received for a small subset of this data. Any errors detected by a statistical test of this data subset would reveal the presence of an eavesdropper on the network. In the absence of any such errors, the transmitter and receiver can confidently use the remainder of the data as a shared secret key for subsequent encoded transmissions between themselves. Practical quantum channels, however, will suffer from unavoidable background error rates due to detector dark counts, and environmentally-induced fluctuations in the polarisation (or phase) state in the fibre etc. In this case the public discussion phase contains an additional stage of error correction and so-called "privacy amplification", as further discussed in our above-cited co-pending international application filed today (ref: 80/4541/03). This both ensures that the transmitter and receiver end up with identical keys and that any key information leaked to an eavesdropper is an arbitrarily small fraction of one bit. This procedure is outlined in C. H. Bennett, F. Bessette, G. Brassard, L. Salvail and J. Smolin: "Experimental Quantum Cryptography", J. Cryptology, 5, 3 (1992).

Figure 8:
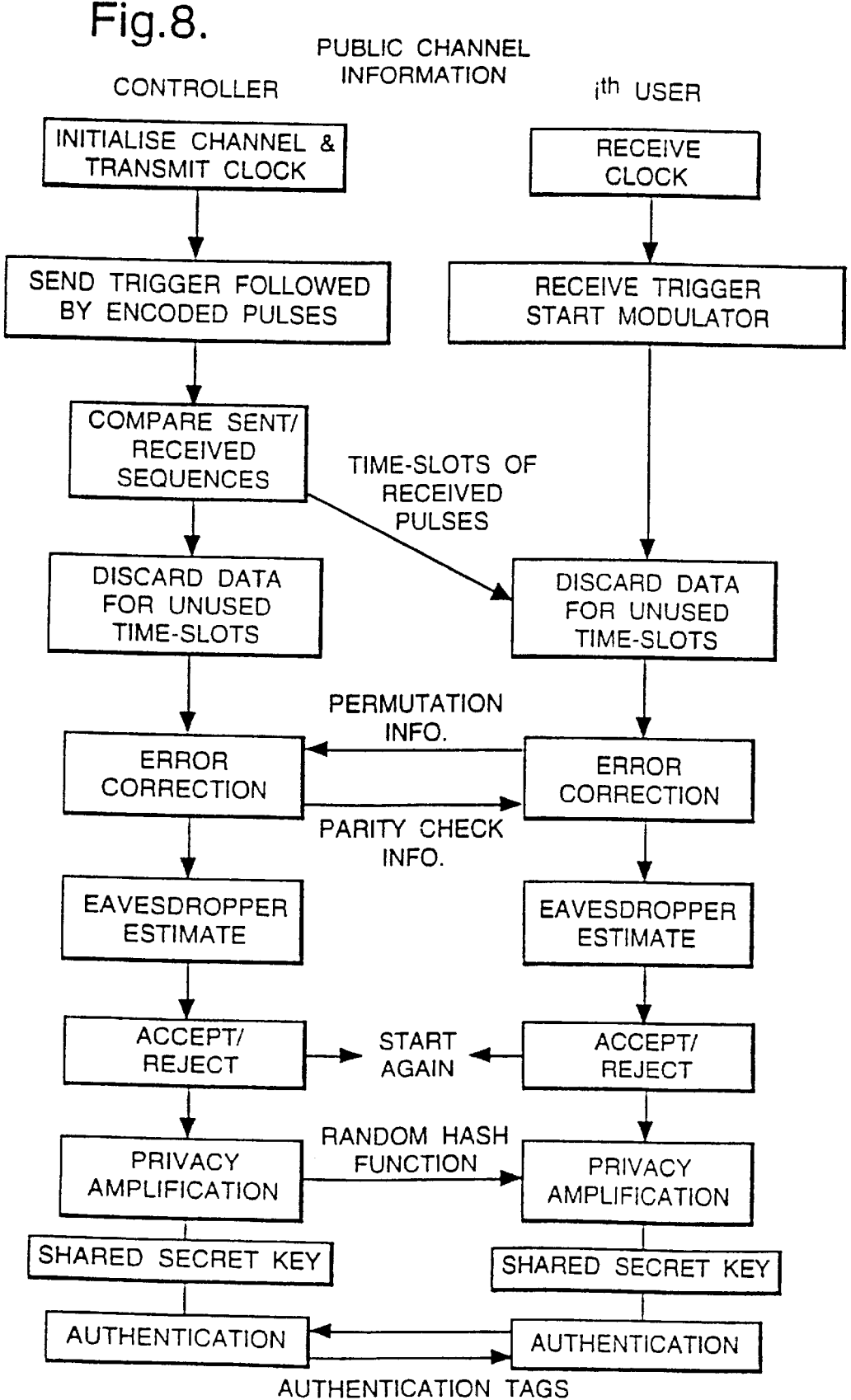
FIG. 8 is a flow diagram.

FIG. 8 is a flow diagram illustrating the procedure discussed above and indicating the flow of information between the transmitter (or "controller") and receiver via the public channel.

In the example shown in FIG. 1, standard signal traffic is carried on the network using a second wavelength $\lambda_s$. This data is intensity-modulated and is accessed at each receiver via a WDM coupler that ideally has coupling ratios of 0 and x at wavelengths $\lambda_q$ and $\lambda_s$ respectively, where x is determined to meet the criterion that all receivers on the network require a measurable signal. The data transmitted on the signal channel may be encrypted using the keys distributed over the quantum channel. At the end of steps (e) and (f) of the quantum cryptography protocol, the transmitter has established a distinct sequence of r secret bits with each ith terminal $R_i$ on the network. These secret bits can be used both for authentication and the generation of a respective shared key $K_i$, as described for the standard point-to-point application in C. H. Bennett, F. Bessette, G. Brassard, L. Salvail and J. Smolin: J. Crypt., 5, 3 (1992) and Bennett/Brassard IBM Tech. Discl. (already referenced above). If required, the controller/transmitter can then use the individual $K_i$ as keys in one-time pad encryptions of a master network key or keys. The latter can then be securely distributed to all receivers/terminals, or subsets of terminals, on the network. Consequently, two types of encrypted communication are enabled. In one-to-one communications the controller and $R_i$ use $K_i$ to encrypt the multi-photon data signals that are broadcast in either direction on the network. Hence, although these signals are broadcast on the network and are therefore accessible to all receivers, only $R_i$ and the controller can decode these particular data transmissions. In this scenario secure inter-terminal communications can still take place between e.g. $R_i$, and $R_j$, however the controller must act as an interpreter using its knowledge of $K_i$ and $K_j$ to decode and encode the incoming and outgoing signals. Any-to-any communications can also take place among subsets of terminals sharing a master key, and in this case, if a transmission path goes via the controller, the controller only needs to perform routing or re-transmission of the incoming encoded data. A fresh key may be transmitted periodically, to maintain security.

The use of a multiple-access network and the establishing of different keys at different receivers on the network is described in further detail in the abovecited International application filed this day.

In the embodiments discussed above with reference to FIG. 1 and below with reference to FIG. 3, the single photons are transmitted in the opposite direction to the multi-photon signal pulses. This is not essential, however, bi-directional transmission helps to isolate the two channels by exploiting the directionality of the fibre couplers to minimise the number of signal photons incident on the quantum channel single-photon detector. The necessity for such isolation will depend on the relative sensitivity of the single-photon detector at the quantum and signal channel wavelengths ($\lambda_q$ and $\lambda_s$), and on whether the two channels are required to operate at the same times. However, since the power in the signal channel is likely to be $>10^6$ times that in the quantum channel, it is necessary to consider the possibility that the signals could readily saturate the single-photon detector and hence generate errors in the quantum transmission. Therefore, isolation of the two channels is likely to be increased by the use of a WDM coupler and/or an in-line filter in front of the single photon detector, which passes $\lambda_q$ but strongly attenuates $\lambda_s$. (Note that component 8 in FIG. 1 already contains such a filter to isolate the quantum channel source from the signal channel). The degree of attenuation required at $\lambda_s$ will be increased if the signal and quantum channels are transmitted unidirectionally, but will still be achievable using the above cited methods. Appropriate fibre filters can be based upon fibre-gratings made using photo-refractive techniques.

Figure 3:
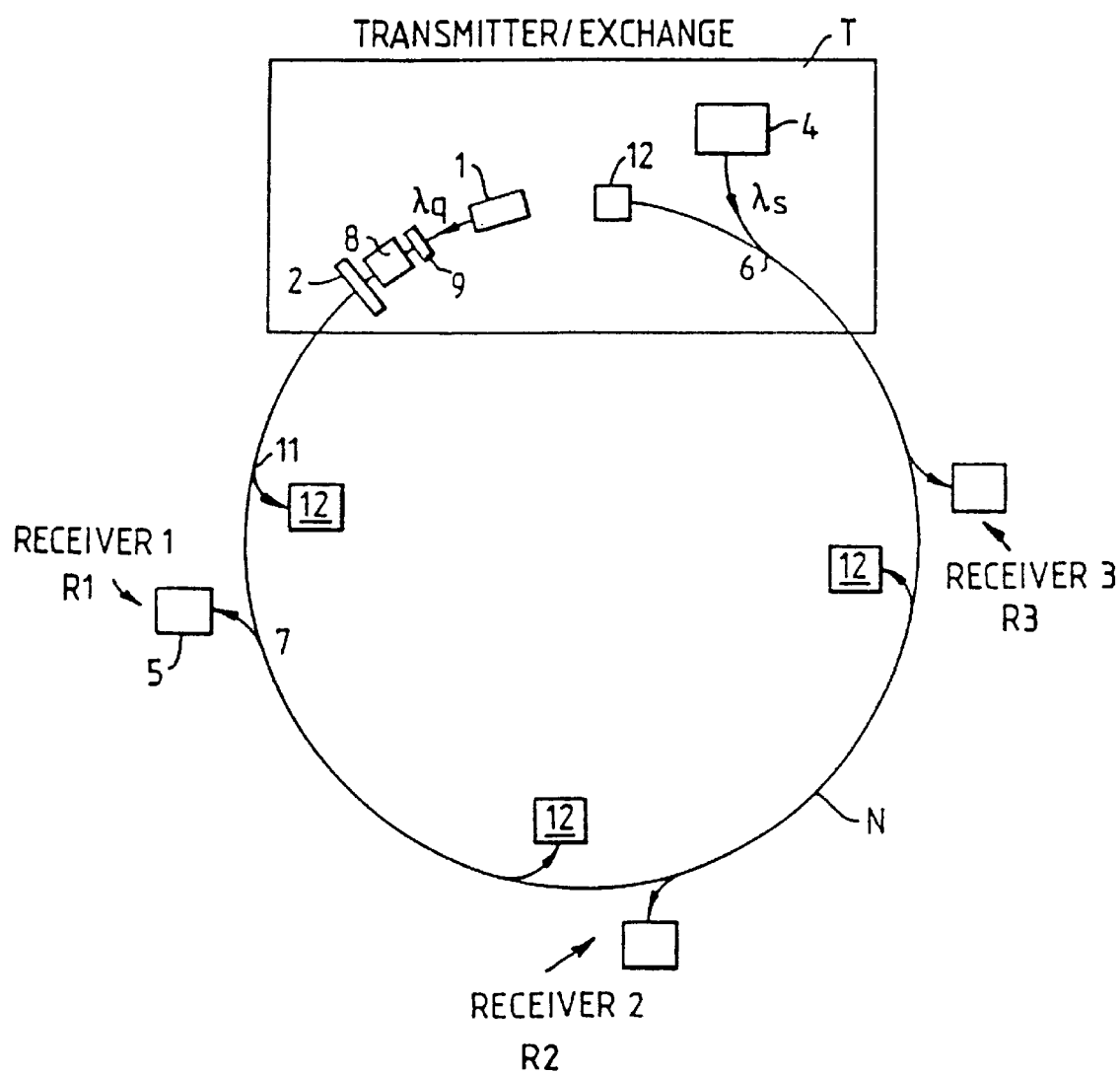
FIG. 3 is a block diagram of a ring network embodying the second aspect of the present invention.

FIG. 3 shows a first embodiment of the second aspect of the present invention. This example again uses a ring topology with a transmitter/exchange 1 connected via the ring to a plurality of receivers Ri-Rn.

Figure 6:
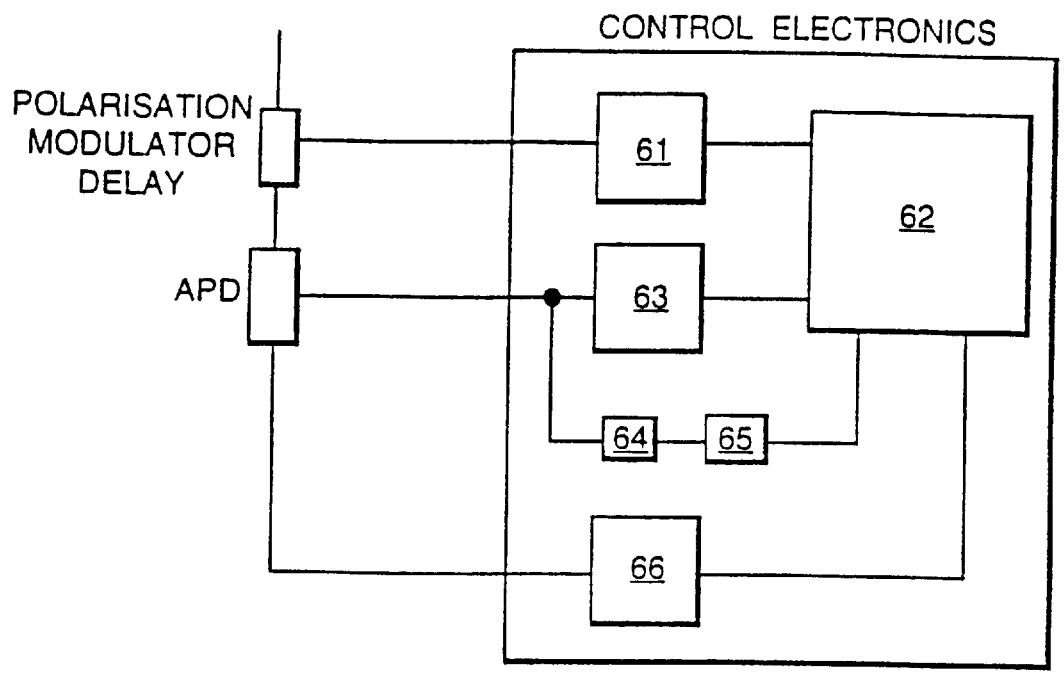
FIG. 6 is a block diagram of a receiver for use with the networks of FIGS. 3 and 5.

The transmitter now contains a polarisation modulator 2 which is used to encode each photon with one of the possible quantum states as in the standard protocol. Unlike in the scheme shown in FIG. 1, the couplers 11 are chosen so that a substantial fraction of the photons in the quantum channel are tapped off at each receiver 12 and destructively measured as described in the standard protocol. For the example of the three receiver network, the sequence of couplers 11 may have coupling fractions of 25%, 33% and 50% respectively. In this case, if the loss in the transmission fibre is negligible, the three receivers and the transmitter (via the return leg) will all receive equal fractions of photons. Each single photon receiver 12 has the configuration shown in FIG. 6.

A single photon detector comprising a polarisation modulator and a highly biased avalanche photodiode APD (FIG. 2) is connected to each coupler output and to the return leg of the transmission fibre in the transmitter/ exchange.

As seen in FIG. 2, the single photon detector comprises a polarisation controller 21 followed by a polarisation modulator 22. The output of the modulator 22 is passed to a polarisation splitter/combiner which provides outputs via two paths, one of the paths incorporating a delay loop 24. The two paths are combined at a second splitter/combiner 23 and the resulting signal output to the APD 25.

The output of the APD is fed to a control processor 62 via a circuit comprising a discriminator/ amplifier 63 and electronic filter 64 and a local oscillator 65. The control processor 62 provides control outputs to the drive electronics 61 for the polarisation modulator and to the bias supply 66 for the single-photon detector APD.

The transmitter has an output stage which includes a single-photon source and a polarisation modulator controlled by a microprocessor. In addition, the transmitter incorporates a single-photon detector, which as in the receivers, may be formed from a highly biased silicon or germanium APD together with an appropriate polarisation filter. In use, this detector is used to receive those photons which have not been destructively detected at any of the receivers and which have returned to the transmitter.

Figure 5B:
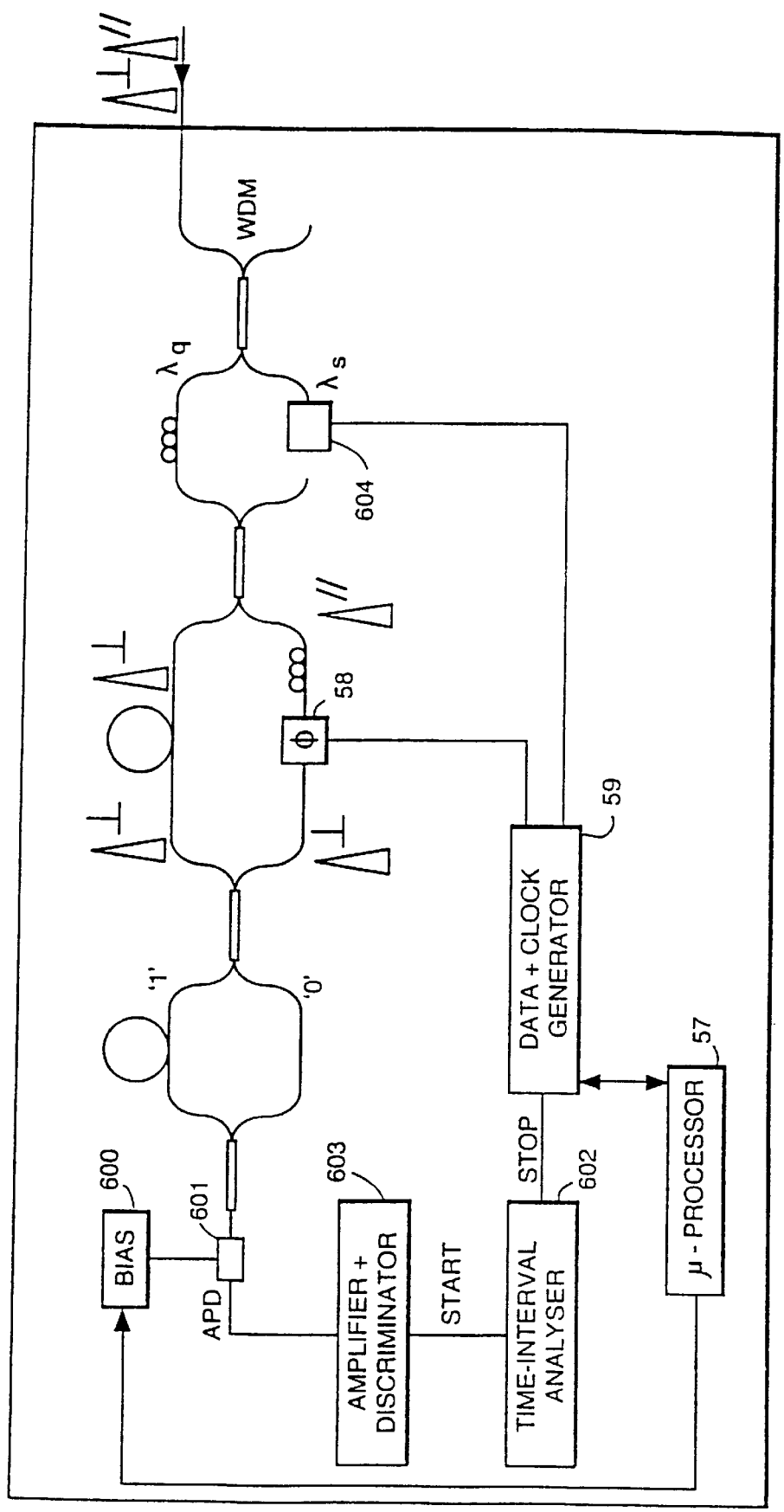

An alternative version of this embodiment encodes and decodes different phase states rather than different polarisation states [P. D. Townsend, J. G. Rarity and P. R. Tapster, Elect. Lett., 29, 1291 (1993) and P. D. Townsend, Elect. Lett. 30, 809 (1994)]. In this embodiment, the transmitter of FIG. 5a is substituted for the output stage of the transmitter exchange shown in FIG. 3, and similarly each of the receivers is replaced by a receiver configured as shown in FIG. 5b. In the transmitter output stage of this embodiment, a first pulsed semiconductor laser 51, operating at a first wavelength $\lambda_q$, where, e.g., $\lambda_q$=1300 nm provides the optical source for the quantum channel. The laser and a modulator driver 53 for a phase modulator 54 are controlled by a microprocessor 55. The phase modulator 54 is located in one branch of the transmitter. A polarisation controller PC (e.g. BT&D/HP MCP1000) is located in the other branch of the transmitter. A second semiconductor laser 52 provides a bright multi-photon source at a wavelength $\lambda_s$ where, e.g., $\lambda_s$=1560 nm. This signal is used for timing and calibration as described above. The signal at $\lambda_s$ is coupled to the output of the transmitter via a WDM coupler 56 which may be, e.g. a JDS WD1315 series device.

As an alternative to the use of separate sources for the quantum channel and the timing signal, a single semiconductor laser may be used feeding its output via a fused fibre coupler FC to two different branches, one including an attenuator, and the other branch being unattenuated. An optical switch may then be used to select either the bright or attenuated output. Depending upon the frequency requirement, either a slow electro-mechanical device such as the JDS Fitel SW12 or a fast electro-optic device such as the United Technologies Photonics YBBM could be used.

In the receiver of this embodiment, a respective control microprocessor 57 controls the receiver phase modulator 58 via a modulator driver 59. The receiver control processor also controls a detector bias supply 600 for the receiver single-photon detector 601. In both the transmitter and the receiver, where the signal path branches, fused-fibre 50/50 couplers are used. Suitable couplers are available commercially from SIFAM as model P22S13AA50. The timing signal at $\lambda_s$ is detected by a PIN-FET receiver 604.

Appropriate phase modulators 54, 58 for the data encoding and decoding are lithium niobate or semiconductor phase modulators operating at, e.g., 1–10 MHZ. An appropriate lithium niobate device is available commercially as IOC PM1300. An appropriate driver for the phase modulators is a Tektronix AWG2020, and this can also be used as a clock generator for the system. For the single-photon detectors, APDs as discussed above with reference to FIG. 3 may be used. Significant improvements could be obtained by combining the phase modulators and fibre devices shown in FIGS. 5a and 5b into single integrated structures. Variations on the current design or that discussed in P. D. Townsend, J. G. rarity and P. R. Tapster, Elect. Lett. 29, 634 (1993) could be integrated onto a lithium niobate chip with the fibre paths replaced by waveguides and the modulator region defined by electrodes as in a standard device. Alternative fabrication methods include e.g. photo-refractively-defined planar silica waveguide structures or semiconductor waveguide structures. In general, integration should lead to improved stability and compactness for the transmitter and receiver structures. In particular, this embodiment uses an NEC 5103 Ge APD cooled to 77 K using, e.g., Hughes 7060H cryo-cooler or a liquid nitrogen dewar or cryostat. In the receiver in this embodiment, just a single APD is used with the signals corresponding to the different branches of the receiver being separated in time by virtue of a delay loop in the upper branch labelled "1". The key distribution protocol requires each received photon to be associated with a given clock period and also identified as a 0 or 1 depending upon which branch of the receiver it comes from. These functions are performed by a time interval analyser 602 (e.g. Hewlett-Packard 53110A). The start signals for this device are provided by the APD output after processing by a circuit 603 comprising an amplifier and discriminator which may be respectively, e.g. Lecroy 612 and Lecroy 821.

The timing signal referred to above may take the form of either a single trigger pulse, which is then used to initiate a burst of key data on the quantum channel, or as a continuous stream of pulses at the system clock frequency which are used to re-time the receiver clock between key transmissions. Before key transmission commences, the receiver varies the phase modulator DC bias level in order to zero the phase shift in the interferometer (i.e. photon transmission probability is maximised at one output port and minimised at the other). FIGS. 5a and 5b also show the relative spatial, temporal and polarisation changes experienced by the two components of a quantum channel pulse as they propagate through the transmitter and receiver. If all fibres in the system are polarisationpreserving then no active polarisation control or static polarisation controllers are required in the system. However if standard fibre is used for the transmission link then active polarisation control will be required at the input to the receiver. This can be performed using a standard detector, feedback circuit and automated polarisation control as described in our co-pending International application PCT/GB93/02637 (WO94/15422).

Phase encoding as used in the version of this embodiment discussed above may also be substituted for polarisation encoding in any other of the embodiments described herein.

In use, the network of these embodiments is operated using the conventional quantum cryptography protocol, in that different polarisation (or phase) bases are randomly selected at the transmitter and used to encrypt outgoing signals. After a sufficient number of photons have been transmitted for each receiver to establish its own key, a "public discussion" phase is entered in which the transmitter and receivers communicate using multi-photon signals to compare the statistics of the transmitted and received signals. At this point, the conventional protocol is modified in that the comparisons carried out in the control processor of the transmitter/exchange include comparisons on the data signals received back at the transmitter/exchange single-photon detector. This part of the discussion phase is therefore internal to the transmitter and so inherently less vulnerable to interceptions.

Figure 4A:
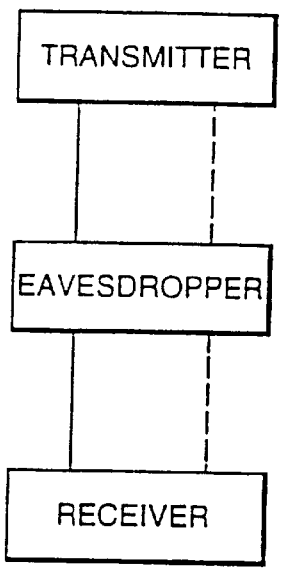
FIGS. 4a and 4b are block diagrams illustrating the intervention of an eavesdropper in a point-to-point link and a ring network respectively.
Figure 4B:
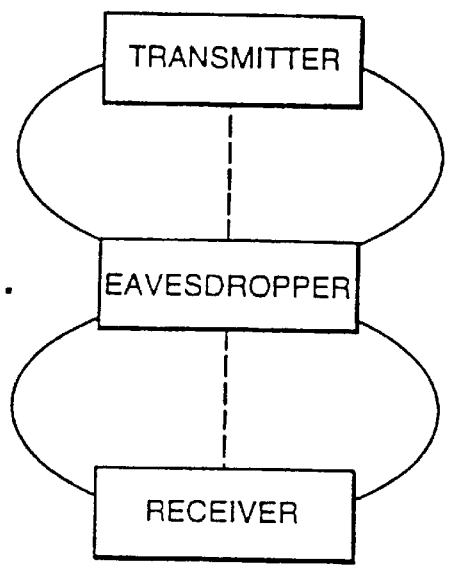

As seen in FIG. 4a, a conventional transmitter/receiver pair can be subject to a successful eavesdropping attack without that attack being detected, provided the eavesdropper can intercept both the public and quantum channels. This is taken account of in the standard protocols by the use of secure authentication procedures, see for example the above-cited IBM Technical Disclosure Bulletin. In the diagram the quantum channel is shown by the full line and the dashed line denotes the public (classical) channel. However, the eavesdropper of FIG. 4a would still be detected successfully where the method of this aspect of the invention is used, since his presence would still be revealed by that part of the public discussion phase which is carried out internally within the transmitter. Undetected eavesdropping of the system in accordance with this aspect of the invention would require the considerably more complex structure shown in FIG. 4b.

A further possible attack upon such an implementation requires Eve (the eavesdropper) to intercept the quantum channel on both sides of a given user Bob. Then by transmitting and detecting a multi-photon signal Eve can determine unambiguously the state of Bob's modulator. Again in practice it is likely to be very difficult for Eve to establish connections to two or more points in the network. Nonetheless, where it desired to protect against an attack of the type described this may be done by providing at least one of the receivers on the network with a photon detector connected to the network by a relatively weak tap. This photon detector need not be of the sensitivity of the single photon detectors employed conventionally in receivers, nor need every user have such a detector. The presence of such a detector in the network facilitates the detection of any multi-photon probe used by Eve.

Figure 7:
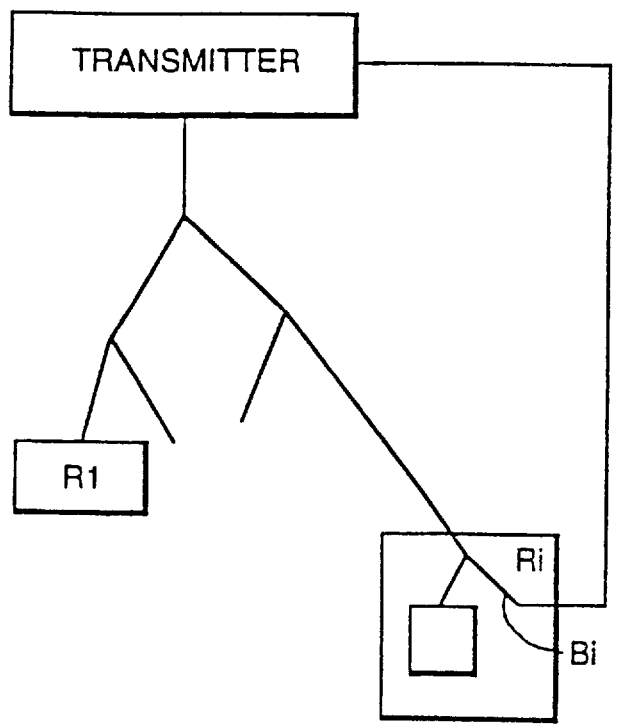
FIG. 7 is a block diagram showing a branch network in which the ith receiver is looped-back to the transmitter.

FIG. 7 shows a second embodiment of this aspect of the invention. In this embodiment a tree structure is used rather than a ring network. One or more selected receivers Ri are connected with an additional branch Bi which is looped back to the transmitter. The network then functions in the manner described above for each receiver $R_i$ which is provided with loop back to the transmitter. Other receivers on the network, such as R1, use the protocol without the additional internal checks by the transmitter. Such a network therefore is able to mix different levels of service providing different levels of security for different respective users.

The system of the first embodiment may be modified to include some of the additional features of the second embodiment, thereby providing enhanced security. In particular, the transmitter/exchange structure of FIG. 3 may be substituted for the transmitter/exchange of FIG. 1. The transmitter then, as in conventional quantum cryptography systems, randomly chooses between two encryption bases and uses the selected bases to modulate an outgoing single-photon signal. Subsequently, as in the first embodiment, the receiver modulates the received single-photon signal non-destructively and returns the photon to the transmitter. As described in the introduction above, the receiver in this embodiment does not then need to choose between two different encryption bases but can operate using a single predetermined encryption basis. This therefore simplifies the modulator structure required for the receiver.

What is claimed is:

1. A method of communicating a key between a transmitter location and a receiver location using quantum cryptography including the initial steps of:

(a) outputting from the transmitting location a single-photon signal;

(b) modulating the single-photon signal at the receiver location and returning the now modulated said single-photon signal to the transmitter location; and (c) detecting at the transmitter location the returned said single-photon signal modulated by the receiver in step (b).

2. A method as in claim 1 in which the transmitter outputs the single-photon signal in step (a).

3. A method as in claim 2 in which the transmitter modulates the outgoing single-photon signal using a selected modulation basis, and uses the same basis in detecting the returned signal in step (c).

4. A method as in claim 1 in which in step (b) the receiver selects one of a plurality of encryption alphabets corresponding to different non-commuting quantum mechanical operators and modulates the single-photon signal using the selected alphabet.

5. A method as in claim 1 in which in step (a) the output single-photon signal is modulated.

6. A method as in claim 5 in which in step (b) the receiver modulates the single-photon signal using a selected one of a pair of operators corresponding to symbols from different encryption alphabets.

7. A method as in claim 1 in which in step (a) the signal is output from the transmitter onto a multiple-access network and for each output signal step (b) is carried out by a respective one of a plurality of receivers connected to the multiple-access network.

8. A method as in claim 1 further including:
outputting a multi-photon signal onto a network from the transmitter,
returning the multi-photon signal to a receiver at the transmitter,
comparing the transmitted and received multi-photon signal and calibrating the transmitter in accordance with the results of a comparison therebetween.

9. A method as in claim in which the step of calibrating the transmitter includes setting a variable modulator in accordance with the results of the comparison to compensate for any variation in a signal parameter across the network.

10. A method of communicating a key between a transmitter location and a receiver location using quantum cryptography including the steps of:
returning from the receiver location to the transmitter location at least some single-photon signals encoded and output from the transmitter location, and
subsequently comparing states of the signals as transmitted and received at the transmitter location, thereby detecting the presence of any eavesdropper intercepting the signal.

11. A method as in claim 10 in which single-photon signals from the transmitter are output onto a multi-access network connecting the transmitter to a plurality of receivers.

12. A method as in claim 11 in which a looped-back path for returning single-photon signals to the transmitter is provided for some only of the plurality of receivers connected to the network.

13. A method as in claim 10 in which others of the single-photon signals are detected destructively at the receiver.

14. A communications system for use in a method of quantum cryptography comprising:
a transmitter,
one or more receivers,
a network linking the transmitter to each receiver,
a source for generating a single-photon signal,
each receiver including a modulator arranged (a) to modulate a single-photon signal received from the source using a chosen modulation state and (b) to return the modulated single-photon signal to the transmitter, and
the transmitter including a single-photon detector arranged to detect the returned single-photon signal.

15. A system as in claim 14 in which the source for generating the single photon signal is located at the transmitter.

16. A system as in claim 15 in which the transmitter includes a modulator for modulating outgoing single-photon signals.

17. A communications system for use in a method of quantum cryptography comprising:
a transmitter,
one or more receivers,
a network linking the transmitter to the or each receiver,
the transmitter including means for generating a single-photon signal and modulating the single-photon signal using a chosen encryption alphabet,
each receiver including a single-photon detector for detecting a single-photon signal from the receiver,
the network including a looped-back path for returning at least some of the single-photon signals output by the transmitter to the transmitter, and
the transmitter including a single-photon detector arranged to detect the returned single-photon signal, in use the transmitter comparing the states of the single-photon signals as transmitted and returned.

18. A system as in claim 14 in which the network is a multiple access network connecting a plurality of receivers to the transmitter.

19. A method of communication using quantum cryptography including:
selecting at a transmitter one of a plurality of encryption alphabets corresponding to different, non-commuting quantum mechanical operators, and encoding a signal for transmission to the receiver using the selected operator,
a receiver further modulating the single-photon signal received from the transmitter and returning it to the transmitter,
the transmitter using the quantum mechanical operator selected for the outgoing signal in detecting the returned signal modulated by the receiver, and
subsequently comparing the states of the signals as transmitted and received at the transmitter, thereby detecting the presence of any eavesdropper intercepting the single-photon signal.

* * * * *